(12) United States Patent
Nasuno et al.

(10) Patent No.: US 12,334,737 B2
(45) Date of Patent: Jun. 17, 2025

(54) POWER CONTROL SYSTEM AND POWER CONTROL METHOD

(71) Applicant: KANEKA CORPORATION, Osaka (JP)

(72) Inventors: Yoshiyuki Nasuno, Osaka (JP); Haruya Mori, Osaka (JP)

(73) Assignee: KANEKA CORPORATION, Osaka (JP)

( * ) Notice: Subject to any disclaimer, the term of this patent is extended or adjusted under 35 U.S.C. 154(b) by 916 days.

(21) Appl. No.: 17/481,223

(22) Filed: Sep. 21, 2021

(65) Prior Publication Data
US 2022/0006294 A1 Jan. 6, 2022

Related U.S. Application Data

(63) Continuation of application No. PCT/JP2020/008134, filed on Feb. 27, 2020.

(30) Foreign Application Priority Data

Mar. 22, 2019 (JP) ................................ 2019-054985

(51) Int. Cl.
*H02J 3/32* (2006.01)
*G05B 15/02* (2006.01)
(Continued)

(52) U.S. Cl.
CPC ............... *H02J 3/32* (2013.01); *G05B 15/02* (2013.01); *G06Q 20/145* (2013.01); *G06Q 50/06* (2013.01);
(Continued)

(58) Field of Classification Search
CPC ...... H02J 7/35; H02J 3/32; H02J 3/003; H02J 3/004; H02J 2300/24; H02J 13/00002;
(Continued)

(56) References Cited

U.S. PATENT DOCUMENTS 10,452,127 B1* 10/2019 McNamara ........... G06F 1/3206
2013/0257152 A1* 10/2013 Matsui ..................... H02J 1/10
307/22
(Continued)

FOREIGN PATENT DOCUMENTS

JP 2017-034968 A 2/2017
JP 2017-055598 A 3/2017
(Continued)

OTHER PUBLICATIONS

International Search Report issued in PCT/JP2020/008134; mailed Apr. 14, 2020.

*Primary Examiner* — Richard Isla
*Assistant Examiner* — Johali A Torres Ruiz
(74) *Attorney, Agent, or Firm* — Studebaker Brackett PLLC

(57) ABSTRACT

A power control system and method for suppressing purchase power peaks or controlling surplus power household consumption according to changes. The power control system comprises a monitoring unit, an electricity storage quantity acquisition unit, and an electricity storage controller. The monitoring unit monitors a generated power quantity which an electricity generator generates using renewable energy and a purchase power quantity which a consumer purchases via a power grid. The electricity storage controller executes processes of discharging power from an electricity storage cell if the purchase power quantity is greater than or equal to a first threshold value; charging the storage cell if the generated power quantity is greater than zero and the purchase power quantity is less than or equal to a second threshold value less than the first threshold value; and charging and discharging the storage cell such that the acquired electricity storage quantity reaches a target value.

15 Claims, 4 Drawing Sheets

(51) Int. Cl.
*G06Q 20/14* (2012.01)
*G06Q 50/06* (2012.01)
*H02J 3/00* (2006.01)
*H02J 3/38* (2006.01)
*H02J 7/35* (2006.01)
*H02J 13/00* (2006.01)

(52) U.S. Cl.
CPC .............. *H02J 3/004* (2020.01); *H02J 3/381* (2013.01); *H02J 7/35* (2013.01); *H02J 13/00002* (2020.01); *H02J 2300/24* (2020.01)

(58) Field of Classification Search
CPC ......... Y04S 20/12; Y03E 70/30; Y02E 10/56; G07F 15/008
See application file for complete search history.

(56) References Cited

U.S. PATENT DOCUMENTS

| | | | | |
|---|---|---|---|---|
| 2014/0094985 A1* | 4/2014 | Hibiya | ................... | G05B 15/02 |
| | | | | 700/297 |
| 2016/0011617 A1* | 1/2016 | Liu | ........................ | H02J 3/14 |
| | | | | 700/287 |
| 2018/0037121 A1* | 2/2018 | Narla | ........................ | H02J 3/38 |
| 2018/0262003 A1* | 9/2018 | Yabe | ........................ | G01W 1/10 |
| 2020/0295571 A1* | 9/2020 | Hanao | ................... | H02J 3/381 |

FOREIGN PATENT DOCUMENTS

| | | |
|---|---|---|
| JP | 2017-205013 A | 11/2017 |
| JP | 2018-182847 A | 11/2018 |

\* cited by examiner

POWER CONTROL SYSTEM AND POWER CONTROL METHOD

CROSS-REFERENCE TO RELATED APPLICATIONS

This application claims benefit of priority to International Patent Application No. PCT/JP2020/008134, filed Feb. 27, 2020, and to Japanese Patent Application No. 2019-054985, filed Mar. 22, 2019, the entire contents of each are incorporated herein by reference.

BACKGROUND

Technical Field

The present disclosure relates to a power control system and a power control method.

Background Art

In recent years, a power generation device using a renewable energy is not only for electric power companies, but being widely used by general consumers. For example, in the case of using sunlight as a renewable energy, a user who is a general consumer installs a solar photovoltaic device on the roof of a building on their own lot or the like. Then, the user causes a load device used by themselves to operate, by the generated electrical power which is generated by the solar photovoltaic device.

As mentioned above, the user may introduce a power storage system for operating a load apparatus by the generated electrical power from a solar photovoltaic device. The method of using the power storage system, for example, connects the power generation device using a renewable energy for which a solar photovoltaic device is representative, and a power storage system, and then charges a storage battery by the excess amount of generated electrical power that is not being consumed. The technology related to power supply systems including such a power storage system is disclosed in Japanese Unexamined Patent Application, Publication No. 2017-205013, for example.

SUMMARY

By the introduction of a power storage system, although peak suppress of purchased electrical power purchased by the consumer via an electric power grid and home consumption of excess electrical power of renewable energy power generation becomes possible, for the former, it is desired to fully charge the storage battery in advance to ensure a dischargeable amount, and for the latter, it is desired to empty the storage battery in advance to ensure a chargeable amount. However, it is difficult to simultaneously realize the securing of this dischargeable amount and securing of this chargeable amount.

Therefore, the operation of switching between a control mode performing peak suppression of purchased electrical power and a control mode performing home consumption of excess electrical power is normally being made based on the date/time, etc. However, although this operation is effective in a case of there being adequate difference between the occurrence probability of a peak in purchased electrical power and the occurrence probability of excess electrical power, in the case of there being a slight difference between both occurrence probabilities, there is a problem in not being able to handle when an event different from the switched control mode occurs.

The present disclosure has been made taking account of such a situation. Accordingly, the present disclosure provides a power control system and a power control method capable of performing control to perform peak suppression of purchased electrical power, and control to perform home consumption of excess electrical power, in response to a change in situation.

A power control system according to the present disclosure includes a monitoring unit which monitors a generated electrical power amount which is generated by a power generation device using renewable energy and a purchased electrical power amount purchased by a consumer via an electric power grid; a storage amount acquisition unit which acquires a storage amount of a storage battery; and a storage amount target value setting unit which sets a storage amount target value which is a target value for the storage amount. The power control system further includes a power storage control unit which executes: first processing of discharging from the storage battery in a case of the purchased electrical power amount being at least a first threshold; second processing of charging to the storage battery in a case of the generated electrical power amount being greater than 0 and the purchased electrical power amount being no more than a second threshold which is a threshold smaller than the first threshold; and third processing of conducting charging and discharging of the storage battery so that the acquired storage amount becomes the storage amount target value in cases other than these.

A power control method according to the present disclosure is a power control method executed by a power control system. The method includes the steps of monitoring a generated electrical power amount generated by a power generation device using a renewable energy, and a purchased electrical power amount purchased by a consumer via an electric power grid; and acquiring a storage amount of a storage battery by a storage amount acquisition unit; setting a storage amount target value which is a target value for the storage amount by a storage amount target value setting unit. The method further includes executing, by a power storage control unit, a first processing of discharging from the storage battery in a case of the purchased electrical power amount being at least a first threshold; a second processing of charging to the storage battery in a case of the generated electrical power amount being greater than 0 and the purchased electrical power amount being no more than a second threshold which is a threshold smaller than the first threshold; and a third processing of performing charging and discharging of the storage battery so that the acquired storage amount becomes the storage amount target value in cases other than these.

According to the present disclosure, it is possible to perform appropriate control by control to perform peak suppression of purchased electrical power, and control to perform home consumption of excess electrical power, in response to a change in situation.

DETAILED DESCRIPTION

Hereinafter, an example of an embodiment of the present disclosure will be explained by referencing the attached drawings.

<System Configuration>

Figure 1:
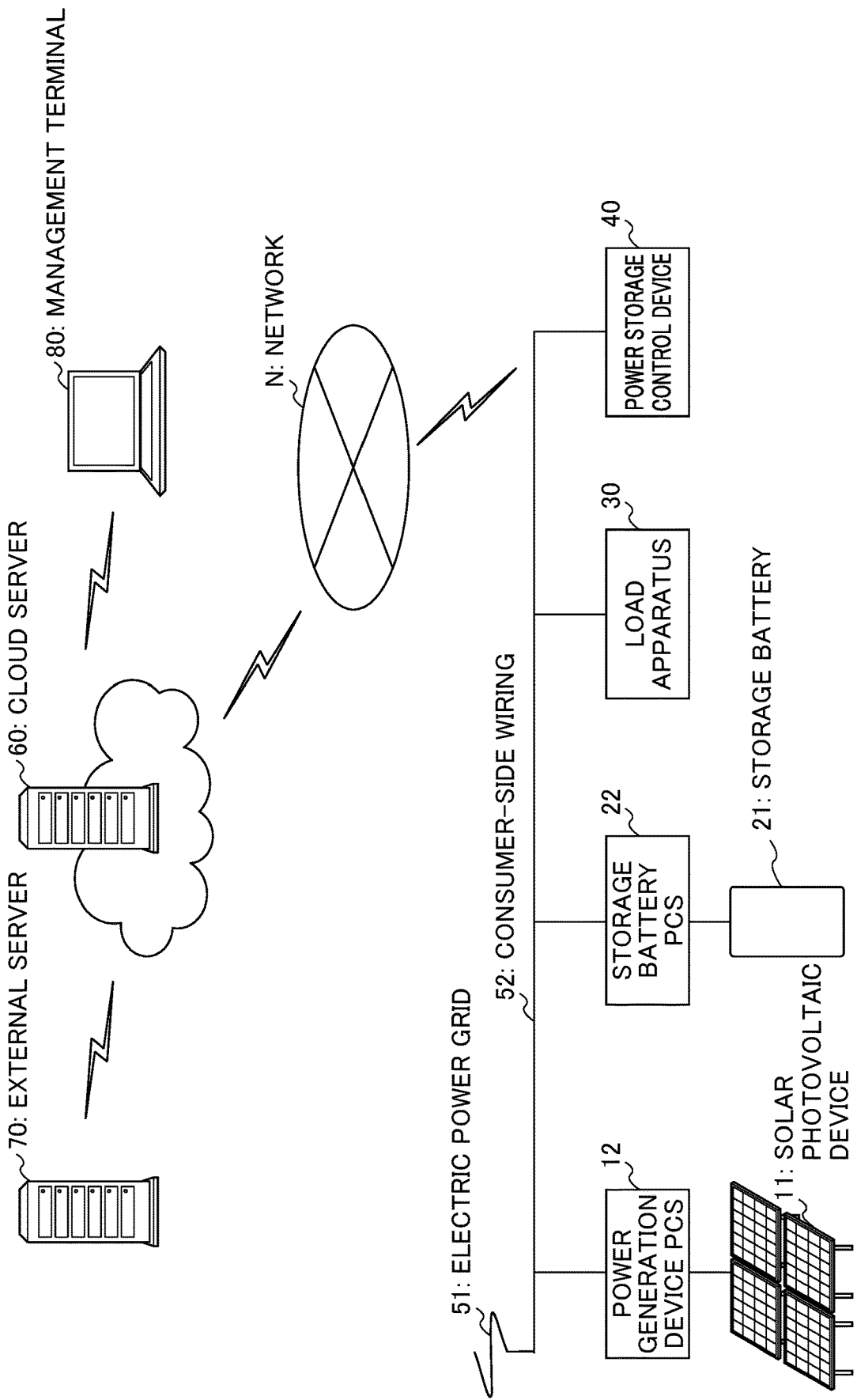
FIG. 1 is a block diagram showing an example of the overall configuration of a power control system according to an embodiment of the present disclosure.

FIG. 1 is a block diagram showing the overall configuration of a power control system S according to the present embodiment. As shown in FIG. 1, the power control system S includes: a solar photovoltaic device 11; a power generation device power conditioner 12; a storage battery 21; a storage battery power conditioner 22; a load apparatus 30; a power storage control device 40; an electric power grid 51; consumer-side wiring 52; a cloud server 60; an external server 70; and a management terminal 80. It should be noted that the "power conditioner" is noted as "PCS" in the drawings.

Herein, the solar photovoltaic device 11; power generation device power conditioner 12; storage battery 21; storage battery power conditioner 22; load apparatus 30; and power storage control device 40 are used by installing in the lot of the consumer, for example. Herein, the consumer may be a business that operates a factory or the like, or may be a general user who uses a house.

The consumer-side wiring 52 connected with the electric power grid 51 by power system interconnection type is constructed in this lot of the consumer. Then, the solar photovoltaic device 11; power generation device power conditioner 12; storage battery 21; storage battery power conditioner 22; load apparatus 30; and power storage control device 40 are connected in parallel to the AC terminals of this consumer-side wiring 52, and are driven by receiving the supply of the generated electrical power generated by the solar photovoltaic device 11 or the purchased electrical power which was purchased from the electric power company via the electric power grid 51.

Herein, as a premise of the following explanation, it is assumed that the consumer is subject to the output limitations related to reverse power flow to the electric power grid 51, according to the contract with the electric power company. It should be noted that, as the renewable energy in the present embodiment, although a case of performing power generation using sunlight is assumed, this is merely an example for explanation. The present embodiment can be applied also to a case of performing power generation using renewable energy other than sunlight, such as wind power, hydro power, geothermal energy and biomass.

The cloud server 60 and external server 70 are used by the operation business of a power control system S. The management terminal 80 is used by the operation business of the power control system S or a consumer.

Each apparatus included in this power control system S is connected to be able to communicate with each other via a network N. The communication between each of these apparatuses may be performed in accordance with any communication system, and this communication system is not particularly limited. In addition, the communication between each apparatus may be performed directly between apparatuses without going through the network N. For example, the communication between the power storage control device 40 and each other apparatus connected to the consumer-side wiring 52 may be directly performed using signal wire which is omitted from illustration.

The power control system S having such a configuration monitors the generated electrical power amount which is generated by the solar photovoltaic device 11 using renewable energy, and the purchased electrical power amount purchased by the consumer via the electric power grid. In addition, the power control system S executes first processing of charging from a storage battery in a case of purchased electrical power amount being at least a first threshold, executes second processing of charging a storage battery in a case of the generated electrical power amount being greater than 0, and the purchased electrical power amount being no more than a second threshold which is a threshold smaller than the first threshold, and executes third processing of charging/discharging the storage battery so that the power storage amount acquired from the storage battery becomes a target value in a case other than these.

For this reason, according to the power control system S, it becomes possible to perform appropriate control by control which performs peak suppression of purchased electrical power, and control which performs home use of excess electrical power, in response to a change in situation. Since it is thereby possible to perform the appropriate control even without switching the control mode in a pre-set schedule, an electric bill reduction or effective practical use of energy can be more efficiently implemented.

Next, each apparatus included in the power control system S will be explained in detail. The solar photovoltaic device 11 is a device which performs power generation by converting the solar energy of sunlight into electricity by the photovoltaic effect. By defining a solar string made by connecting a solar cell module in series as one circuit, and connecting each circuit to a connection box, the solar photovoltaic device 11 consolidates DC current generated by each solar cell module into one. This DC current consolidated into one is outputted to the power generation device power conditioner 12 via diodes, switches, etc. for backflow prevention in the connection box.

The power generation device power conditioner 12 includes an inverter which converts the DC current outputted from the solar photovoltaic device 11 to AC current which is generally used at facilities, residences, etc. The AC current converted by the power generation power conditioner 12 is supplied to the storage battery power conditioner 22, load apparatus 30 and power storage control device 40.

The storage battery 21 is a secondary battery which stores electrical power. By the storage battery power conditioner 22 making the power storage in the storage battery 21, it becomes possible to use the load apparatus 30 upon power outage, or use the surplus power generated during the day at night. In addition, it becomes possible to charge with the low cost nighttime electrical power and use during the day. For example, as mentioned above, the present embodiment charges from the storage battery in a case of the purchased electrical power amount being at least the first threshold, charges the storage battery in a case of the generated electrical power amount being greater than 0 and the purchased electrical power amount being no more than the second threshold which is a threshold smaller than the first threshold, and does charging/discharging of the storage battery so that the power storage amount acquired from the storage battery becomes a target value in cases other than these. It is thereby possible to more effectively use generated electrical power.

The storage battery power conditioner 22 includes an inverter which converts the DC current stored in the storage battery 21 into AC current generally used in residences, etc. The AC current converted by the storage battery power conditioner 22 is supplied to the load apparatus 30 and power storage control device 40. It should be noted that, in the present embodiment, the power generation device power conditioner 12 and storage battery power conditioner 22 are provided as separate bodies corresponding to the solar photovoltaic device 11 and storage battery 21; however, they are not limited thereto. For example, it may be configured so as to realize the power generation device power conditioner 12 and battery storage power conditioner 22 by one hybrid-type power conditioner corresponding to the solar photovoltaic device 11 and storage battery 21.

The load apparatus 30 includes a plurality of electrical equipment which operate by the electrical power generated by the solar photovoltaic device 11, and electrical power purchased (i.e., power purchase) from the electric power company. The electrical equipment included in the load apparatus 30 are not particularly limited, and electrical equipment such as various machines operating in factories, air-conditioning, or a refrigerator, television and electric water heater (for example, EcoCute (registered trademark)) are included in the load apparatus 30.

The power storage control device 40 suppresses the generated electrical power outputted by the solar photovoltaic device 11, by controlling the power generation device power conditioner 12 so as to satisfy the condition of output limitation received from the electric power company related to reverse power flow to the electric power grid 51, based on the control setting value received from the cloud server 60. In addition, the power storage control device 40 performs charging/discharging of the storage battery 21, by controlling the storage battery power conditioner 22, based on the control setting values in which at least one of the storage amount target value, first threshold and second threshold received from the cloud server 60 are included.

In addition, the power storage control device 40 collects various past record information related to operation of the solar photovoltaic device 11. The power storage control device 40, for example, collects the past records of the generated electrical power amount of the solar photovoltaic device 11, via the power generation device power conditioner 12. In addition, the power storage control device 40 collects past records of the purchase electrical power amount (i.e., purchased electric amount) by monitoring the electrical power supplied from the electric power grid. Furthermore, the power storage control device 40 acquires the storage amount of the storage battery 21 and the charge/discharge electrical power amount via the storage battery power conditioner 22. Furthermore, the power storage control device 40 collects past records of generated electrical power amount, charge/discharge electrical power amount, and electrical power consumption amount obtained by calculating the purchased electrical power amount. The power storage control device 40 sends the past record information collected in this way to the cloud server 60.

The cloud server 60 estimates the generated electrical power amount and consumed electrical power amount, by analyzing the past records information received from the power storage control device 40, disaster information and/or weather information acquired from an external server 70 described later. Then, the cloud server 60 determines the appropriate control setting values according to peak suppression of purchased electrical power and the event probability of home consumption of surplus electrical power, based on the estimation results, and sends this to the power storage control device 40. For reasons such as the accumulation of past record information not being sufficient, in the case of not being able to determine the appropriate control setting value, the control setting value set in a schedule in advance is set in the cloud server 60, and the control setting value according to the current time and date is sent to the power storage control device 40. Furthermore, the cloud server 60, in the case of determining that the possibility of power outage occurring is higher than normal based on the disaster information and/or weather forecast information, sets the storage amount target value to a value higher than an initial target value, and sends to the power storage control device 40.

In addition, in the present embodiment, by determining the appropriate control setting values from various past record information, disaster information and/or weather information, or as necessary, using the control setting values set in a schedule in advance, it is possible to appropriately perform peak suppression control of the purchased electrical power and home consumption control of surplus electrical power. In addition, in the case of the possibility of a power outage occurring being higher than normal, it is possible to secure a large remaining amount of the storage battery to prepare for a power outage. It should be noted that further details of this power storage control device 40 and cloud server 60 are described later by referencing FIGS. 2 and 3.

The external server 70 is a server which provides disaster information and/or weather information. The external server 70 sends the weather information of the area in which the solar photovoltaic device 11 is installed to the cloud server 60. The external server 70 may be a server operated by a meteorological agency or the like. Alternatively, it may be a server operated by an operation business itself of the power control system S, or business affiliated with this operation business.

The management terminal 80 is a terminal for managing the cloud server 60. The operation business or consumer of the power control system S can reference the past results information of the electrical power amount, estimation results of the electrical power amount, etc. stored in the cloud server 60 by using the management terminal 80. In addition, using the management terminal 80, the operation business or consumer can record or update in the cloud server 60 the information related to each apparatus used by the consumer (e.g., model of solar photovoltaic device 11, and number of solar panels), and information such as the contract terms with the electric power company. Furthermore, using the management terminal 80, it is possible to set control setting values such as the storage amount target value, first threshold and second threshold, and appropriately change the standard for determining these thresholds, and values such as the control setting value according to the date/time or day of the week.

The network N, for example, is realized by any of the Internet, LAN (Local Area Network) and phone network system, or a network made by combining these.

An explanation has been provided for each apparatus included in the power control system S above. It should be noted that, in the drawings, although each apparatus is illustrated as one unit each, this is merely an exemplification, and each of these apparatuses may be included in any number of units in the power control system S. In addition, the constituent elements for switching the supply path of generated electrical power during power outage, other than the constituent elements illustrated in FIG. 1, are also connected to the consumer-side wiring 52; however, these constituent elements will be described later by referencing FIG. 4.

<Configuration of Power Storage Control Device>

Figure 2:
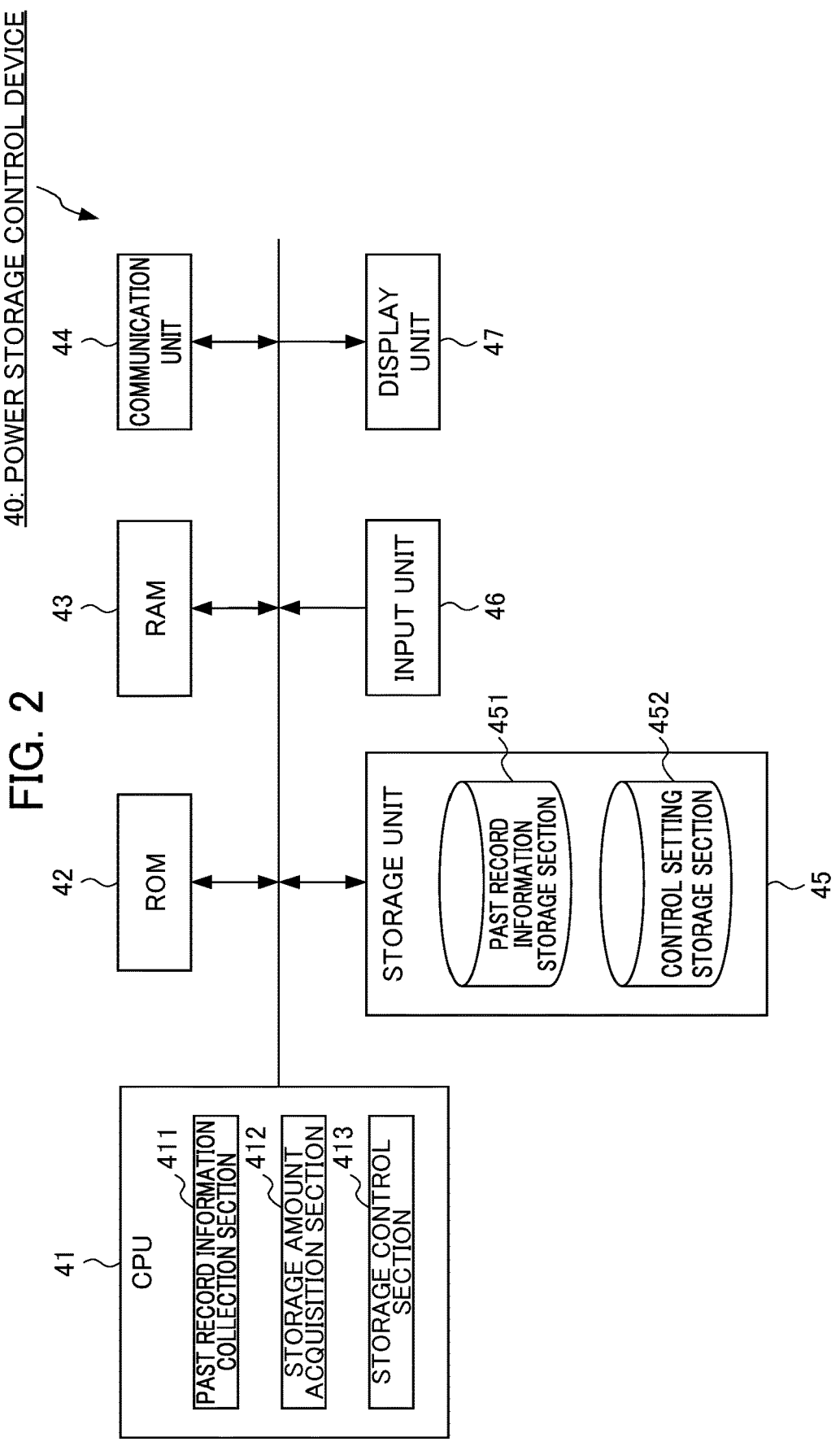
FIG. 2 is a block diagram showing an example of the configuration of a power storage control device according to an embodiment of the present disclosure.

Next, an explanation will be provided for the configuration of the power storage control device 40 by referencing the block diagram of FIG. 2. As shown in FIG. 2, the power storage control device 40 includes: a CPU (Central Processing Unit) 41, ROM (Read Only Memory) 42, RAM (Random Access Memory) 43, communication unit 44, storage unit 45, input unit 46 and display unit 47. Each of these parts is bus connected by signal wire, and send/receive signals with each other.

The CPU 41 executes various processing in accordance with programs recorded in the ROM 42, or programs loaded from the storage unit 45 into the RAM 43. Data, etc. required upon the CPU 41 executing the various processing is stored as appropriate in the RAM 43.

The communication unit 44 performs communication control for the CPU 41 to perform communication with other devices included in the power control system S. The storage unit 45 is configured by semiconductor memory such as DRAM (Dynamic Random Access Memory), and stores various data.

The input unit 46 is configured by external input devices such as various buttons and a touch panel, or a mouse and keyboard, and inputs various information in response to instruction operations of the user. The display unit 47 is configured by a liquid crystal display or the like, and displays images corresponding to image data outputted by the CPU 41.

In addition, in the case of the power storage control device 40 performing operation processing unique to the present embodiment, a past record information collection section 411, storage amount acquisition section 412 and storage control section 413 function in the CPU 41, as shown in FIG. 2. In addition, a past record information storage section 451 and control setting storage section 452 are established in a region of the storage unit 15.

The past record information storage section 451 stores various past record information related to operation of the solar photovoltaic device 11 collected by a past record information collection section 411 described later. The control setting storage section 452 stores the control settings received from the cloud server 60.

The past record information collection section 411 is a portion which collects various past record information related to operation of the solar photovoltaic device 11. The past record information collection section 411 collects the past records of generated electrical power amount of the solar photovoltaic device 11 via the power generation device power conditioner 12, for example. In addition, the past record information collection section 411 collects the past records of purchased electrical power amount, by monitoring the electrical power supplied from the electric power grid. Furthermore, the past record information collection section 411 collects the charge/discharge electrical power of the storage battery 21 via the storage battery power conditioner 22, and collects the past records of electrical power consumption amount, by calculation of the generated electrical power amount and purchased electrical power amount.

It should be noted that the past record information collection section 411 may acquire past record information of the purchased electrical power amount from a wattmeter in the residence which measures the electrical power, or a smart meter installed by an electric power company. In addition, the past record information collection section 411 may connect to HEMS (Home Energy Management System), and collect past record information from the HEMS. Furthermore, the past record information collection section 411 may collect the past record information of the electrical power consumption amount, by communication compliant to a standard such as ECHONET Lite (registered trademark) from electrical equipment included in the load apparatus 30.

Alternatively, the past record information collection section 411 may further include a function as a wattmeter, for example. Then, the past record information collection section 411 may acquire past record information of the purchased electrical power amount, by the past record information collection section 411 itself executing measurement by the function of this wattmeter.

The past record information collection section 411 causes the collected past record information to be stored in the past record information storage section 451. In addition, the past record information collection section 411 is a portion which sends past record information stored in the past record information storage section 451 to the cloud server 60 based on predetermined conditions, upon associating with identification information of the solar photovoltaic device 11. For example, the past record information sending section 112 sends the past record information to the cloud server 60 at predetermined time intervals. It should be noted that the sending of past record information to the cloud server 60 may be performed by the past record information collection section 411 in this way, but is not limited thereto. For example, the past record information may be sent directly to the cloud server 60 from each apparatus (solar photovoltaic device 11, etc.) other than the power storage control device 40, without going through the past record information collection section 411.

The power storage amount acquisition section 412 acquires the power storage amount of the storage battery 21. Specifically, the storage amount acquisition section 412 may acquire the storage amount of the storage battery 21 in accordance with a pre-set schedule, irrespective of instructions from the cloud server 60. Alternatively, the storage amount acquisition section 412 may acquire the storage amount of the storage battery 21, according to an instruction from the cloud server 60.

The power storage control section 413 performs charging to the storage battery 21 by the generated electrical power outputted by the solar photovoltaic device 11 and electrical power supplied from the electric power grid, by controlling the solar photovoltaic device power conditioner 12 and storage battery power conditioner 22, based on the control settings stored by the control setting storage section 452, and controls the generation amount of the solar photovoltaic device 11 so as to satisfy the condition of the output limitation received from the electric power company in relation to reverse power flow to the electric power grid 51. In addition, the power storage control section 413 performs discharge from the storage battery 21, based on the above-mentioned control settings. These control settings are control settings determined by the cloud server 60 based on the monitoring results or predetermined thresholds, as mentioned above.

<Configuration of Cloud Server 60>

Figure 3:
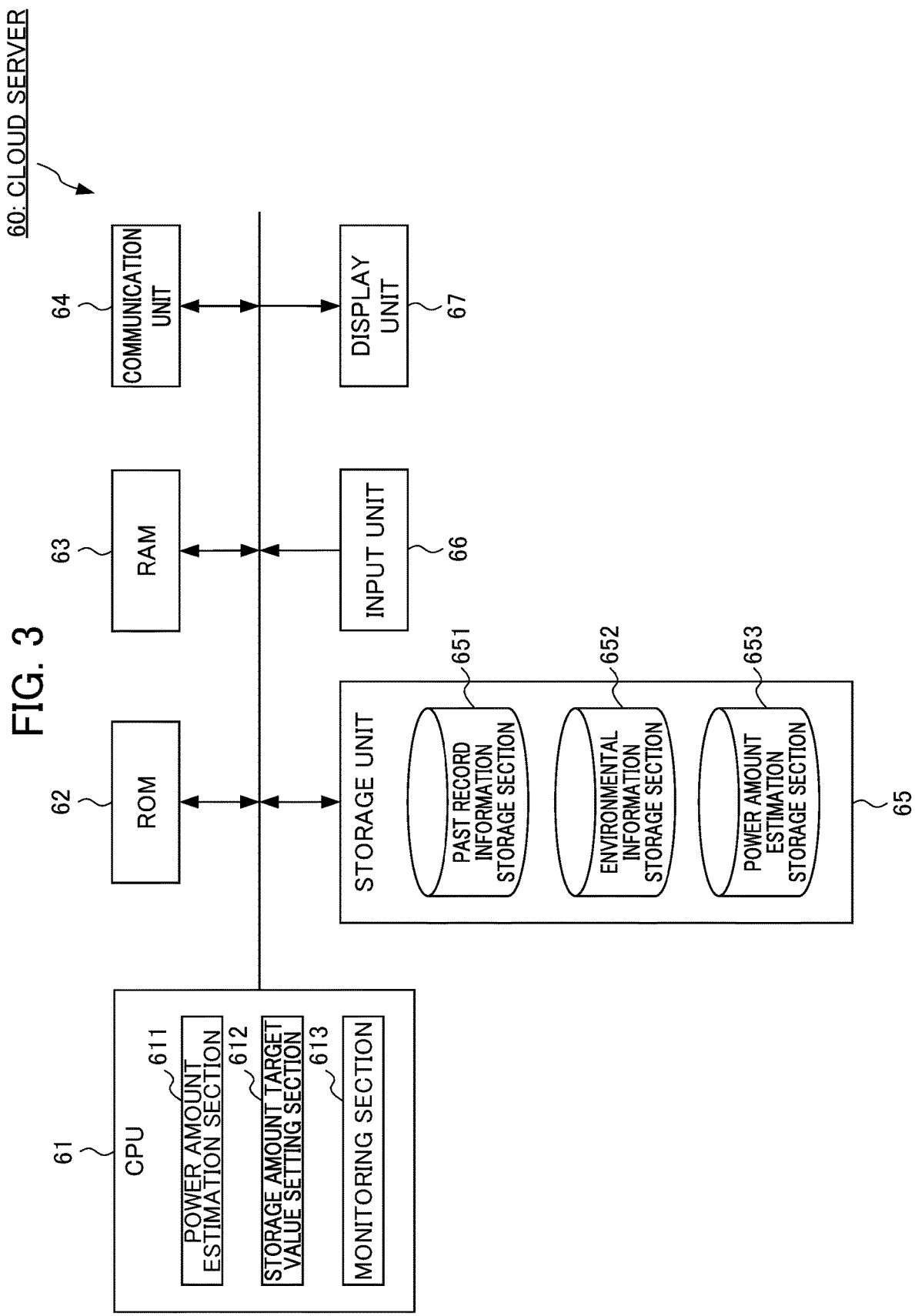
FIG. 3 is a block diagram showing an example of the configuration of a cloud server according to an embodiment of the present disclosure.

Next, an explanation is provided for the configuration of the cloud server 60 by referencing the block diagram of FIG. 3. As shown in FIG. 3, the cloud server 60 includes a CPU 61, ROM 62, RAM 63, communication unit 64, storage unit 65, input unit 66 and display unit 67. Each of these parts is bus connected by signal wire, and send/receive signals with each other.

Herein, a function as hardware of each of these parts is equivalent to the function as hardware of each part of the same name with only the reference number differing, possessed by the aforementioned power storage control device 40. Therefore, redundant explanations will be omitted.

In addition, in the case of the cloud server 60 performing operation processing unique to the present embodiment, the output amount estimation section 611, storage amount target value setting section 612 and monitoring section 613 function in the CPU 61, as shown in FIG. 3. In addition, a past record information storage section 651, environmental information storage section 652 and power amount estimation storage section 653 are established in a region of the storage unit 65.

The past record information storage section 651 stores various past record information received from the power storage control device 40, information related to each apparatus used by the consumer acquired from the management terminal 80, and information such as contract terms with the electric power company.

The environmental information storage section 652 stores disaster information and/or weather information received from the external server 70. The disaster information is disaster information of the area in which the solar photovoltaic device 11 is installed, for example, is information of an earthquake, landslide disaster, hindrance of large-scale infrastructure, etc. The weather information is weather information of the area in which the solar photovoltaic device 11 is installed, and is information such as the weather, daylight hours, sunlight duration, temperature and humidity. In addition, the weather information includes conventional weather information predicted by a specialized agency such as a meteorological agency. For example, it is weather information from present until the next week, and includes estimated values for every 30 minutes. In addition, in order to perform comparison between the future weather information and past weather information, past weather information may be included.

The power amount estimation storage section 653 stores the electrical power amount estimated by the power amount estimation section 611 described later. For example, for the generated electrical power amount generated by the solar photovoltaic device 11 using sunlight, and purchased electrical power amount purchased by the consumer via the electric power grid, estimated values for every 30 minutes are stored.

The power amount estimation section 611 estimates estimated values for every 30 minutes, of the generated electrical power amount generated by the solar photovoltaic device 11 using sunlight and the purchased electrical power amount purchased by the consumer via the electric power grid, for example, as the electrical power amount as described above. The estimation is performed based on information such as the past record information stored in the past record information storage section 651, and weather information stored in the environmental information storage section 652.

For example, in the case of solar photovoltaic generation, the power generation amount changes depending on the weather such as sunlight duration and air temperature. For example, the corresponding relationship with sunlight duration is the strongest, and the power generation amount increases as the sunlight duration becomes greater. In addition, the power generation amount decreases as the temperature becomes higher. In other words, when the intensity of solar irradiation is great and air temperature is low, the power generation amount becomes the greatest. In addition, even in a case of the air temperature being high, since the temperature of photovoltaic module falls to some extent when the wind is strong, the power generation amount increases by this amount. Therefore, the power amount estimation section 611, in the case of estimating the power generation amount of the future for a certain time slot, estimates the power generation amount of the future for this certain time slot, based on the estimated values for sunlight duration, air temperature and wind conditions of the future of this certain time slot, and information such as the model of solar photovoltaic device 11 and number of solar panels installed.

Furthermore, in the case of wind powered power generation, the power generation amount changes depending on the wind conditions, for example. Therefore, the power amount estimation section 611 estimates the estimated value of power generation amount, based on the strength of wind, length of time for which wind of at least a certain strength is blowing, etc.

In addition, for the case of any of the solar power generation and wind power generation, the power generation amount changes according to the difference in the installation state such as installation angle and installation orientation of solar panels. For this reason, even the same solar photovoltaic device 11 or the same weather information, a difference will arise in the power generation amount. Therefore, when configuring to further perform estimation based on a past power generation amount, it is possible to further improve the accuracy of estimation. In this case, the power amount estimation section 611, for example, in the case of estimating the power generation amount of the future for a certain time slot, establishes the power generation amount of a past time slot resembling the estimated values for the sunlight duration, air temperature and wind conditions of the future of this certain time slot as the estimated value of generated power amount of this future certain time slot. It should be noted that, even for the case of generating power using another renewable energy other than sunlight and wind power, it is possible to estimate the estimated value of power generation amount, basing on the estimated values of weather information having a correlation with the power generation amount of this renewable energy.

In addition, the estimated value of the purchased electrical power amount can be calculated by subtracting the estimated value of power generation amount from the estimated value of electrical power amount consumed by the consumer (i.e., estimated value of power demand). This is because this electrical power amount after subtraction is the electrical power amount for which a need arises to purchase due to not being satisfied by power generation. Herein, electrical power amount purchased by the consumer shows various trends depending on differences in load configuration; therefore, it estimated based on the electrical power amount consumed in the past. For this reason, the power amount estimation section 611 performs estimation of the electrical power amount consumed by the consumer, based on the total past consumed power amount of the consumer. For example, the average value for past consumed electrical power amount of the consumer in the same time slot as the certain time slot in the future is defined as the estimated value of the electrical power amount consumed by the consumer in this certain time slot in the future.

In this case, when configuring so as to further perform estimation based on the weather information or operation information of a factory, it is possible to further improve accuracy of estimation. For example, when the winter season air temperature is low, the electricity consumption amount increases accompanying a heating demand increase. This is a trend which is the same in both a factory and residence. In this case, the power amount estimation section 611 can estimate the electrical power amount consumed by the consumer, by correcting the total of the past consumed electrical power amount of the consumer based on the estimated values of air temperature in the future of a certain time slot, for example.

The power amount estimation section 611 stores the estimated value every 30 minutes for the estimated value of the generated electrical power amount and purchased electrical power amount estimated in this way, for example, in the power amount estimation storage section 653.

The storage amount target value setting section 612 sets the target value for the storage amount of the storage battery 21. For example, although the target value for the power control system S to execute peak suppression of purchased electrical power corresponds to 100%, and the target value for complete home consumption of surplus electrical power of the electrical power generated by the solar photovoltaic device 11 corresponds to 0%, a numerical value therebetween is set as the target value in order to assume a balance of the two. For this reason, the storage amount target value setting section 612 may set the above-mentioned target value according to the difference between the estimated value of the generated electrical power amount and the estimated value of the purchased electrical power amount. Alternatively, the storage amount target value setting section 612 may acquire the disaster information and/or weather information stored in the environmental information storage section 652, and may set the above-mentioned target value to a value higher than the initial target value, based on the acquired disaster information and/or weather information. In addition, the storage amount target value setting section 612 may schedule set the above-mentioned target value according to the date and time.

The monitoring section 613 monitors the estimated values of generated electrical power amount and purchased electrical power amount estimated by the power amount estimation section 611 and stored in the power amount estimation storage section 653. Then, the monitoring unit 613 generates control settings for discharging from the storage battery 21, in the case of the purchased electrical power amount being at least the first threshold based on the monitoring results, and sends this to the power storage control device 40.

In addition, the monitoring section 613, in the case of the generated electrical power amount not being zero, and the purchased electrical power amount being no more than a second threshold which is a threshold smaller than the first threshold, generates control settings for performing charging to the storage battery 21 by the generated electrical power outputted by the solar photovoltaic device 11, and sends to the power storage control device 40. Furthermore, the monitoring section 613 may send the above-mentioned first threshold and second threshold themselves to the power storage control device 40.

In addition, in cases other than this, the monitoring section 613 generates control settings for performing charging/discharging of the storage battery 21, so that the storage amount acquired from the storage battery 21 becomes a target value set by the storage amount target value setting section 612, and sends this to the power storage control device 40.

It should be noted that this first threshold is set to a value such that reverse power flow to the electric power grid 51 does not occur. In addition, this second threshold is set to a value such that purchased electrical power does not arise even if performing charging to the storage battery 21. For example, these thresholds are set by the operation business of the power control system S, according to the environment, etc. in which implementing the present embodiment.

Furthermore, the second threshold may be a negative value. By configuring in this way, it is possible for the purchased electrical power to become minus, i.e., reverse power flow to occur, and then start charging of the storage battery, and thus it becomes possible to minimize the disposal amount of renewable energy, in a situation where reverse power flow is accepted.

<Operation Processing>

A detailed explanation was provided above for the configurations of the power storage control device 40 and cloud server 60. Next, the flow of operation processing executed by the present embodiment will be explained by referencing the flowchart of FIG. 4. It should be noted that the sending of past record information to the cloud server 60 by the past record information collection section 411, the sending of disaster information and/or weather information to the cloud server 60 by the external server 70, and management related to the cloud server 60 by the management terminal 80 are executed as appropriate in parallel with the processing shown in the flowchart of FIG. 4.

In Step S11, the power amount estimation section 611 estimates the generated electrical power amount and purchased electrical power amount. In Step S12, the monitoring section 613 monitors the estimated values for the generated electrical power amount and purchased electrical power amount estimated in Step S11.

In Step S13, the monitoring section 613 determines whether the purchased electrical power amount is at least the first threshold. In the case of the purchased electrical power amount being at least the first threshold, it is determined as YES in Step S13, and the processing advances to Step S14. On the other hand, in the case of the purchased electrical power amount not being at least the first threshold, it is determined as NO in Step S13, and the processing advances to Step S16.

In Step S14, the monitoring section 613 generates control settings for performing control according to the determination results in Step S13, and sends these generated control settings to the power storage control device 40.

In Step S15, power storage control section 413 executes discharge control of the storage battery 21, based on the control settings sent in Step S13. Then, the processing returns to Step S11, and is repeated.

In Step S16, monitoring section 613 determines whether the generated electrical power amount is greater than 0. In the case of the generated electrical power amount being greater than 0, it is determined as YES in Step S16, and the processing advances to Step S18. On the other hand, in the case of the generated electrical power amount not being greater than 0, it is determined as NO in Step S16, and the processing advances to Step S17.

In Step S17, the monitoring section 613 determines whether the storage amount is greater than the target value. In the case of the storage amount being greater than the target value, it is determined as YES in Step S17, and the processing advances to Step S14. On the other hand, in the case of the storage amount becoming no more than the target value, it is determined as NO in Step S17, and the processing advances to Step S20.

In Step S18, the monitoring section 613 determines whether the purchased electrical power amount is no more than the second threshold. In the case of the purchased electrical power amount being no more than the second threshold, it is determined as YES in Step S18, and the processing advances to Step S22. On the other hand, in the case of the purchased electrical power amount not being no more than the second threshold, it is determined as NO in Step S18, and the processing advances to Step S19.

In Step S19, the monitoring section 613 determines whether the storage amount is greater than the target value. In the case of the storage amount being greater than the target value, it is determined as YES in Step S19, and the processing advances to Step S20. On the other hand, in the case of the storage amount being no more than the target value, it is determined as NO in Step S19, and the processing advances to Step S22.

In Step S20, the monitoring section 613 generates the control settings for performing control according to the determination results in Step S19, and sends these generated control settings to the power storage control device 40.

In Step S21, the power storage control section 413 establishes the storage battery 21 in a stand-by state, based on the control settings sent in Step S20. Then, the processing returns to Step S11 and is repeated.

In Step S22, the monitoring section 613 generates control settings for performing control according to the determination results in Step S19, and sends these generated control settings to the power storage control device 40.

In Step S23, the power storage control section 413 executes charge control of the storage battery 21, based on the control settings sent in Step S20. Then, the processing returns to Step S11 and is repeated.

According to the above explained operation processing, in the power supply system, upon performing operation of switching between a control mode performing peak suppression of purchased electrical power and a control mode performing home consumption of surplus electrical power based on the date and time, etc., it is possible to solve the problem of not being able to cope with an event occurring which differs from the switched control mode. In addition, accompanying this, even when switching the control mode of electrical power at a pre-set schedule, the appropriate control is possible, and an electrical bill reduction or effective practical use of energy can be more efficiently implemented.

MODIFIED EXAMPLES

Although an embodiment of the present disclosure has been explained above, this embodiment is merely an exemplification, and is not to limit the technical scope of the present disclosure. The present disclosure can assume various other embodiments, and various modifications such as omissions and substitutions can be performed within a scope not departing from the gist of the present disclosure. These embodiments and modifications thereof are encompassed in the scope and gist of the disclosure described in the present disclosure, and encompassed in the scope of the disclosure and equivalents thereto described in the claims. For example, embodiments of the present disclosure may be modified as in the following modified examples.

Figure 4:
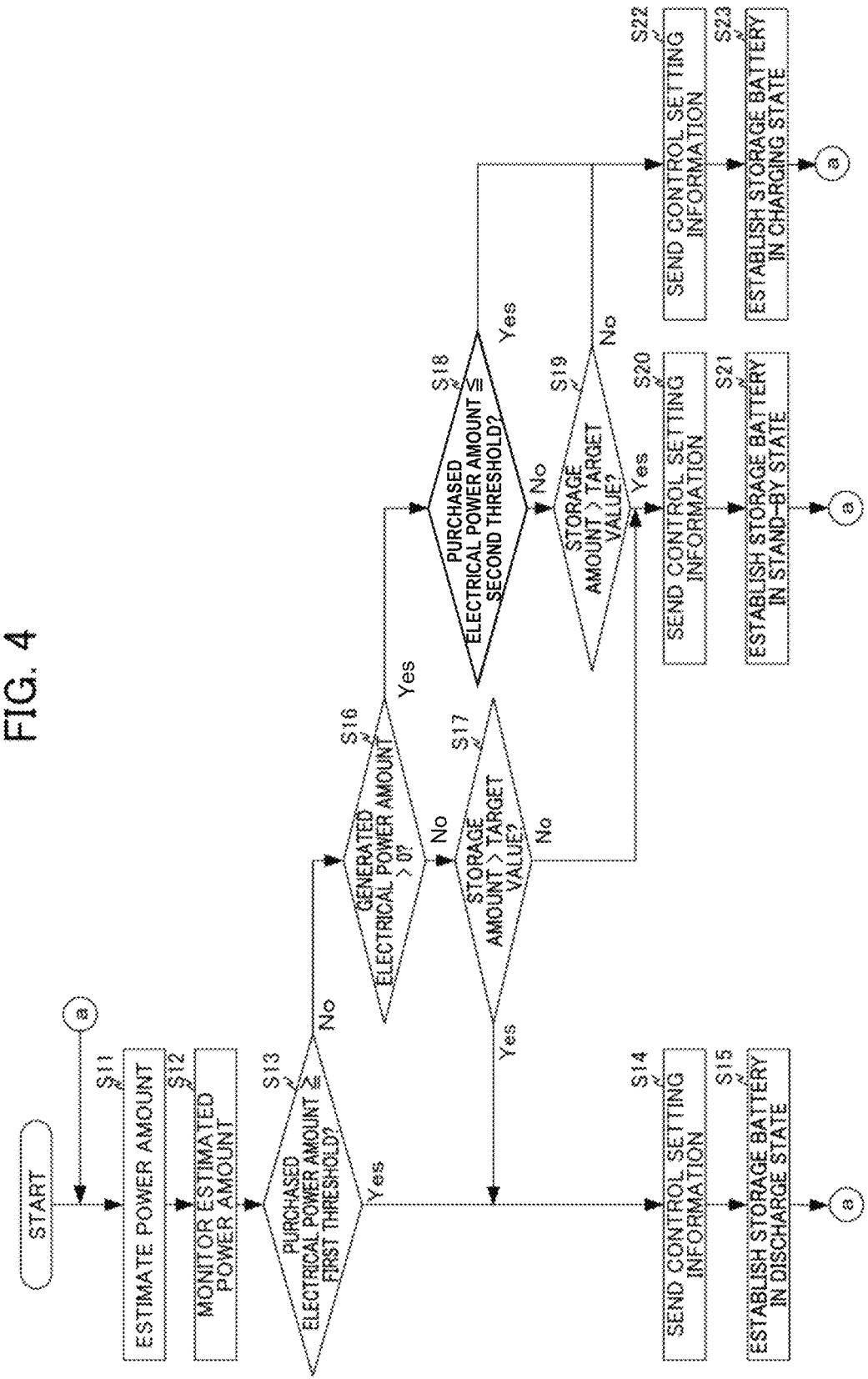
FIG. 4 is a flowchart for explaining the flow of operation processing executed by a power control system according to an embodiment of the present disclosure.

In the flowchart illustrated in FIG. 4, the above embodiment establishes the storage battery in a charging state in the case of the purchased electrical power amount being no more than the second threshold, and then repeats the flow by returning to Step S11; however, it is not limited thereto. For example, even when establishing the storage battery in the charging state, in the case of the purchased electrical power amount becoming no more than the second threshold, it may control the generated electrical power amount which is generated by the solar photovoltaic device 11 using sunlight, so as to increase the purchased electrical power amount.

In the above embodiment, the storage amount acquisition section 412 may acquire the storage amount of the storage battery 21 in accordance with a pre-set schedule, irrespective of the instructions from the cloud server 60, or may acquire the storage amount of the storage battery 21 according to an instruction from the cloud server 60. As a modified example, the power control system S may include a flow switching part which switches between a plurality of operation flows, sets one of this plurality of operation flows, and the storage amount acquisition section 412 may acquire the storage amount of the storage battery 21.

In more detail, this flow switching part may switch the operation flow of the power control system between: a first flow in which the storage amount target value setting section 612 sets the storage amount target value as 100% in the case of acquiring disaster information, and the monitoring section 613 sends control settings for charging the storage battery 21 up to a storage amount of 100% to the power storage control device 40; a second flow in which the power storage control section 413, after charging the storage battery 21 up to the target value in preparation for peak cut, then discharges the storage battery 21 at the timing of peak cut; a third flow in which the storage amount acquisition section 412 acquires the storage amount; and a fourth flow in which the power storage control section 413 discharges the storage amount of the storage battery 21 down to the target value in preparation for surplus charge, and then stands by.

In this case, the flow switching part, in the case of the execution conditions of the first flow being satisfied, may interrupt the second flow, third flow and fourth flow and execute the first flow; in the case of the execution conditions of the second flow being satisfied, may interrupt the third flow and fourth flow and execute the second flow; and in the case of the execution conditions of the third flow being satisfied, may interrupt the fourth flow and execute the third flow.

In addition, in the aforementioned embodiment, although the first threshold and second threshold are set, it is not to be limited thereto. For example, three or more thresholds may be set. Specifically, based on the relationship between the purchased electrical power amount and the threshold, the discharge electrical power amount or charge electrical power amount may be changed not only by switching between simply establishing the storage battery in the discharge state, establishing in the charge state, or establishing in the stand-by state, but also by the purchased electrical power amount falling between which threshold and which threshold.

In addition, the aforementioned embodiment configures to execute operation in accordance with the flowchart of FIG. 4; however, it is not to be limited thereto. For example, control to switch operation may be done depending on which one the operation mode of the power control system S is among a mode of charging the storage battery 21 so to be the charge amount that should be ensured during charging for peak suppression or during stand-by; a mode of discharging from the storage battery 21 so as to be the charge amount that should be ensured during stand-by; a mode of charging the surplus electrical power of the electrical power generated by the solar photovoltaic device 11 to the storage battery 21; or a mode suppressing electrical power of the generation by the solar photovoltaic device 11. Specifically, in the case of a plurality of the storage batteries 21 being installed, the storage battery 21 to be charged/discharged may be determined in each operation mode, and the operation mode may be switched according to the number of storage batteries 21 in charge/discharge.

In addition, the aforementioned embodiment provides the cloud server 60, and performs the estimation of the power amount, and the generation of control settings based on monitoring with the cloud server 60. It is not limited thereto, and as another modified example, it may be configured so as to implement a part or the entirety of these functions of the cloud server 60 in the power storage control device 40.

As exemplified as these modified examples, the present disclosure is not limited to the aforementioned embodiments, and modifications, improvements, etc. in a scope which can achieve the object of the present disclosure are also encompassed by the present disclosure. In addition, in the aforementioned embodiment, an embodiment is realized by devices such as a cloud server; however, it is not particularly limited thereto, and it is possible to realize by common electronic equipment having an information processing function.

In addition, the aforementioned series of processing can be executed by hardware, or can be executed by software. In addition, one functional block may be configured by a single hardware unit, may be configured by a single piece of software, or may be configured by a combination of these. In other words, the functional configurations illustrated in FIGS. 2 and 3 are merely exemplifications, and are not limited thereto. In other words, it is sufficient if a function which can execute the aforementioned series of processing as a whole is provided to the power control system S, and which functional block is used in order to realize this function is not particularly limited to the example of FIG. 5.

For example, the functional configurations included in the present embodiment can be realized by a processor which executes arithmetic processing, and the processors which can be employed in the present embodiment include, in addition to those configured by various processing devices singularly such as a single processor, multiple processor and multi-core processor, a processor in which these various processing devices and processing circuits such as ASIC (Application Specific Integrated Circuit) or FPGA (Field-Programmable Gate Array) are combined.

In the case of executing a series of processing by software, the programs constituting this software is installed in a computer or the like from a network or recording medium. The computer may be a computer built into dedicated hardware. In addition, the computer may be a computer capable of executing various function, for example, a general-purpose personal computer, by installing various programs thereto.

The recording medium containing such programs may be provided to the user by being distributed separately from the device main body in order to provide the programs to the user, or may be provided to the user in a state incorporated into the device main body in advance. The recording medium distributed separately from the device main body is configured by a magnetic disc (including floppy disc), optical disc, magneto-optical disc or the like. An optical disc, for example, is constituted by CD-ROM (Compact Disc-Read Only Memory), DVD (Digital Versatile Disc), Blu-ray (registered trademark) Disc (Blu-ray) or the like. A magneto-optical disc is constituted by MD (Mini-Disc) or the like. In addition, the recording medium provided to the user in a state incorporated into the device main body in advance is constituted, for example, by the ROM 42 of FIG. 2 and ROM 62 of FIG. 3 on which the programs are records, or a hard disk included in the storage unit 45 of FIG. 2 or storage unit 65 of FIG. 3.

It should be noted that, in the present disclosure, the steps defining the program recorded in the storage medium include not only the processing executed in a time series following this order, but also processing executed in parallel or individually, which is not necessarily executed in a time series. In addition, in the present specification, a term system shall mean a general device configured from a plurality of devices, a plurality of means, and the like.

What is claimed is:

1. A power control system comprising:
a monitoring unit configured to monitor a generated electrical power amount which is generated by a power generation device using renewable energy and a purchased electrical power amount purchased by a consumer via an electric power grid;
a storage amount acquisition unit configured to acquire a storage amount of a storage battery;
a storage amount target value setting unit configured to set a storage amount target value which is a target value for the storage amount; and
a power storage controller configured to execute: first processing of discharging from the storage battery in a first case of the purchased electrical power amount being at least a first threshold; second processing of charging to the storage battery in a second case of the generated electrical power amount being greater than 0 and the purchased electrical power amount being no more than a second threshold which is a threshold smaller than the first threshold; and third processing of conducting charging and discharging of the storage battery so that the acquired storage amount becomes the storage amount target value in cases other than the first and second cases, wherein
a power generation amount of the power generation device is controlled so as to increase the purchased electrical power amount, in a case of the purchased electrical power amount remaining no more than the second threshold even after performing the second processing.

2. The power control system according to claim 1, wherein
the storage amount target value setting unit is configured to set in advance at least one of the storage amount target value, the first threshold and the second threshold according to date and time.

3. The power control system according to claim 2, further comprising:
an estimation unit configured to estimate either or both of the generated electrical power amount which is a monitoring target of the monitoring unit, and the purchased electrical power amount which is a monitoring target of the monitoring unit,
wherein the storage amount target value setting unit is configured to set at least one among the storage amount target value, the first threshold and the second threshold, according to an estimated value of the generated electrical power amount and an estimated value of the purchased electrical power amount.

4. The power control system according to claim 3, wherein
the storage amount target value setting unit is configured to acquire disaster information and/or weather estimation information, and set the storage amount target value to a value higher than an initial target value, based on the acquired disaster information and/or weather estimation information.

5. The power control system according to claim 3, wherein
the second threshold is a negative value.

6. The power control system according to claim 2, wherein
the storage amount target value setting unit is configured to acquire disaster information and/or weather estimation information, and set the storage amount target value to a value higher than an initial target value, based on the acquired disaster information and/or weather estimation information.

7. The power control system according to claim 6, wherein
the second threshold is a negative value.

8. The power control system according to claim 2, wherein
the second threshold is a negative value.

9. The power control system according to claim 1, further comprising:
an estimation unit configured to estimate either or both of the generated electrical power amount which is a monitoring target of the monitoring unit, and the purchased electrical power amount which is a monitoring target of the monitoring unit,
wherein the storage amount target value setting unit is configured to set at least one among the storage amount target value, the first threshold and the second threshold, according to an estimated value of the generated electrical power amount and an estimated value of the purchased electrical power amount.

10. The power control system according to claim 9, wherein
the storage amount target value setting unit is configured to acquire disaster information and/or weather estimation information, and set the storage amount target value to a value higher than an initial target value, based on the acquired disaster information and/or weather estimation information.

11. The power control system according to claim 9, wherein
the second threshold is a negative value.

12. The power control system according to claim 1, wherein
the storage amount target value setting unit is configured to acquire disaster information and/or weather estimation information, and set the storage amount target value to a value higher than an initial target value, based on the acquired disaster information and/or weather estimation information.

13. The power control system according to claim 12, wherein
the second threshold is a negative value.

14. The power control system according to claim 1, wherein
the second threshold is a negative value.

15. A power control method executed by a power control system, the method comprising:
monitoring a generated electrical power amount generated by a power generation device using a renewable energy, and a purchased electrical power amount purchased by a consumer via an electric power grid;
acquiring a storage amount of a storage battery by a storage amount acquisition unit;
setting a storage amount target value which is a target value for the storage amount by a storage amount target value setting unit;
executing, by a power storage controller, a first processing of discharging from the storage battery in a first case of the purchased electrical power amount being at least a first threshold; a second processing of charging to the storage battery in a second case of the generated electrical power amount being greater than 0 and the purchased electrical power amount being no more than a second threshold which is a threshold smaller than the first threshold; and a third processing of performing charging and discharging of the storage battery so that the acquired storage amount becomes the storage amount target value in cases other than the first and second cases, and
controlling a power generation amount of the power generation device so as to increase the purchased electrical power amount, in a case of the purchased electrical power amount remaining no more than the second threshold even after performing the second processing.

* * * * *